(12) United States Patent
Beaver, Jr. et al.

(10) Patent No.: US 12,584,588 B1
(45) Date of Patent: Mar. 24, 2026

(54) DRAIN FOR COLLAPSIBLE SPILL CONTAINMENT STRUCTURE

(71) Applicant: HalenHardy LLC, Bellwood, PA (US)

(72) Inventors: Donald L. Beaver, Jr., Bellwood, PA (US); Troy L Beaver, Bellwood, PA (US)

(73) Assignee: Halenhardy LLC, Bellwood, PA (US)

( * ) Notice: Subject to any disclaimer, the term of this patent is extended or adjusted under 35 U.S.C. 154(b) by 302 days.

(21) Appl. No.: 17/659,862

(22) Filed: Apr. 20, 2022

Related U.S. Application Data

(60) Provisional application No. 63/176,927, filed on Apr. 20, 2021.

(51) Int. Cl.
*F16N 31/00* (2006.01)
*B01D 35/02* (2006.01)

(52) U.S. Cl.
CPC ........... *F16N 31/006* (2013.01); *B01D 35/02* (2013.01)

(58) Field of Classification Search
CPC .............................. F16N 31/006; B01D 35/02
USPC ........................................................ 220/571
See application file for complete search history.

(56) References Cited

U.S. PATENT DOCUMENTS

| | | | | | |
|---|---|---|---|---|---|
| 1,664,887 A | * | 4/1928 | Kirkham | ............... | E04H 4/0056 |
| | | | | | 4/506 |
| 2,567,514 A | * | 9/1951 | Hoffman | ............. | A61G 7/0005 |
| | | | | | 4/587 |
| 2,915,097 A | * | 12/1959 | Lewis | ................. | B65D 90/205 |
| | | | | | 220/666 |

| | | | | | |
|---|---|---|---|---|---|
| 3,117,695 A | * | 1/1964 | Cox, Jr. | ................ | B65D 77/065 |
| | | | | | 222/105 |
| 4,306,668 A | * | 12/1981 | Love | ..................... | B65D 90/205 |
| | | | | | 222/185.1 |
| 5,511,683 A | * | 4/1996 | Dailey | .................. | B08B 17/025 |
| | | | | | 220/573 |
| 6,088,848 A | * | 7/2000 | Waterlyn | ............. | A61G 7/0005 |
| | | | | | 4/585 |
| 6,161,960 A | * | 12/2000 | Hiraoka | ............... | B65D 90/046 |
| | | | | | 383/103 |

(Continued)

FOREIGN PATENT DOCUMENTS

| | | | | | |
|---|---|---|---|---|---|
| BR | 202017016157 U2 | * | 3/2019 | ........... | F16N 31/004 |
| GB | 1591323 A | * | 6/1981 | ............. | B29C 63/26 |
| GB | 2506759 A | * | 4/2014 | ............... | B65D 1/34 |

OTHER PUBLICATIONS

Don't let an oil sheen ruin your day. By HalenHardy. Uploaded in 2020. Retrieved from the Internet. (Year: 2020).*

*Primary Examiner* — Don M Anderson
*Assistant Examiner* — Eric C Baldrighi
(74) *Attorney, Agent, or Firm* — Fox Rothschild LLP

(57) ABSTRACT

A secondary containment structure includes: (i) a base; (ii) impermeable, collapsible sidewalls that surround the base to form a containment area; and (iii) a drainage outlet. A bottom boundary of the outlet is positioned at an intersection of the base with a first sidewall. A top boundary of the outlet is formed in the first sidewall. A drainage channel that is formed of a flexible, impermeable material has a first end that is sealed around the drainage outlet, and a second end that includes a fitting that is configured to connect to a hose or filter. The drainage channel may be tapered from the first end to the second end. The drainage channel, and methods of affixing a drainage channel to an existing containment structure, are also disclosed.

18 Claims, 6 Drawing Sheets

(56)        References Cited

U.S. PATENT DOCUMENTS

| | | | |
|---|---|---|---|
| 6,648,008 B1 * | 11/2003 | Price | B08B 17/00 |
| | | | 134/123 |
| 7,086,409 B2 * | 8/2006 | Robinson | A61M 1/84 |
| | | | 220/571 |
| 7,188,744 B2 * | 3/2007 | Hurst | B65B 69/0091 |
| | | | 248/97 |
| 7,861,880 B2 * | 1/2011 | Britt | B65D 88/1687 |
| | | | 220/666 |
| 7,905,368 B1 * | 3/2011 | Christensen | B65D 90/205 |
| | | | 220/9.2 |
| 8,177,087 B2 * | 5/2012 | Noble | B08B 17/00 |
| | | | 220/666 |
| 8,733,579 B2 * | 5/2014 | Claeys | B65D 90/623 |
| | | | 220/9.3 |
| 10,717,596 B1 * | 7/2020 | Archer, Jr. | B65D 90/205 |
| 2002/0131654 A1 * | 9/2002 | Smith | B65D 88/1668 |
| | | | 383/96 |
| 2003/0029873 A1 * | 2/2003 | Moffat | F16N 31/006 |
| | | | 220/573 |
| 2004/0118844 A1 * | 6/2004 | Bennett | B65D 90/205 |
| | | | 220/4.12 |
| 2010/0140263 A1 * | 6/2010 | Claeys | B65D 90/205 |
| | | | 220/9.3 |
| 2016/0229626 A1 * | 8/2016 | Claeys | B65D 88/005 |
| 2021/0114802 A1 | 4/2021 | Claeys | |

* cited by examiner

DRAIN FOR COLLAPSIBLE SPILL CONTAINMENT STRUCTURE

RELATED APPLICATIONS AND CLAIM OF PRIORITY

This patent document claims priority to U.S. provisional patent application No. 63/176,927, filed Apr. 20, 2021, the disclosure of which is fully incorporated into this document by reference.

BACKGROUND

Portable secondary containment structures are commonly used to protect the environment from spills during petroleum and other hydrocarbon-based liquid loading, unloading and storage operations that occur in locations that do not include permanent spill containment installations. For example, when a truck is offloading fuel to a construction site, the truck may drive into the containment structure before the offloading operation so that the structure can contain any leaks or spills that may occur during the offloading operation. Portable containment structures can also be used to provide temporary spill protection around fuel tanks and other oil-filled vessels & equipment such as electrical transformers, generators, light towers, pumps and such that are installed for temporary purposes, such as for a limited-time event, a construction project, or while waiting for a permanent containment structure to be completed.

Portable secondary containment structures are typically made of flexible or otherwise collapsible material. Others have sidewalls that are made from compressible foam, or they may have rigid but foldable sidewalls. These configurations allow the sidewalls to be collapsed to allow a vehicle, storage tank or other equipment to enter the structure. The sidewalls can then be raised around the item to surround the item and provide a barrier between the item and the environment. Examples of such structures are disclosed in, for example, U.S. Pat. Nos. 9,868,427 and 5,762,233, the disclosures of which are fully incorporated into this document by reference.

Once installed, portable containment structures must periodically be drained, such as after a rain or snow event to allow for room in case there is an accidental spill inside the containment structure. One way to do this is to include a pump that expunges the liquid through a conduit that is placed over or through a wall of the structure. However, the use of a pump adds to the cost and maintenance requirements for the temporary installation. In addition or alternatively, some containment structures may include a purge valve in one or more walls to allow fluids to pass through the walls. However, to enable a filter or hose to be attached to the purge valves, the purge valve must be equipped with a fitting. The size of the fitting prevents the opening of the purge valve from reaching all the way to the floor of the structure. This typically means that an inch or more of fluid will not remain below the purge valve's opening, and the residual fluid can then only be removed by manual labor or pumping equipment. In addition, applicable regulations may prohibit the excess water from being discharged if there is the presence of a visible oily sheen on the water inside the containment structure. So, extra care must be taken to pump and treat the contaminated water, adding time and expense to the process.

This document describes a portable containment structure, and a system for draining such a structure, that addresses at least some of the problems described above.

SUMMARY

In some embodiments, a secondary containment structure includes a base and one or more impermeable, collapsible sidewalls that surround the base to form a containment area. The structure also includes a first drainage outlet having an opening with a top boundary and a bottom boundary. The bottom boundary is positioned at an intersection of the base with a first one of the sidewalls, and the top boundary is formed in the first sidewall. A drainage channel has a first end that is sealed around the opening of the first drainage outlet. The drainage channel is formed of a flexible, impermeable material that, when placed on a downward slope, will extend along the slope to an elevation that is below the base. The drainage channel extends from the first end to a second end that is opposite the first end. A fitting is attached to the second end of the drainage channel. The fitting is configured to connect to a hose or filter.

Optionally, a portion of the first sidewall is cut and folded down to extend into the drainage channel. Also optionally, the structure may include one or more floor drains. Also optionally, the first drainage outlet may be positioned proximate to a corner of the containment structure, in which the corner is formed by the first sidewall and a second sidewall of the structure. Also optionally, the drainage outlet may traverse a corner of the structure, and the top and bottom boundaries of the drainage outlet also may extend along a second sidewall.

Optionally, the drainage channel may be tapered so that the first end is larger than the second end, Optionally, the structure may include one or more additional drainage outlets, each of which is positioned proximate to a corresponding additional corner of the containment structure. The bottom boundary also may be partially positioned at an intersection of the base and a second sidewall, and the top boundary may be partially formed in the second sidewall.

Optionally, a sheet of filter material may be positioned on the base. The sheet of filter material may extend upward along the first sidewall to cover the first drainage outlet. Also optionally, a filter insert may be positioned in the opening of the first drainage outlet and extend into the first drainage channel.

Optionally, the first end of the drainage channel may be sealed around the opening of the drainage outlet via a flap that is affixed to the first sidewall. One or more cut-away segments of the first sidewall may then extend into the drainage channel.

In other embodiments, a drainage system for a collapsible secondary containment structure includes a drainage channel having a first end that extends from the flap and that is configured to be sealed around an opening of a first drainage outlet in the sidewall. The drainage channel also includes an opposite second end, with a fitting that is attached to the second end and that is configured to connect to a hose or filter. The drainage channel may be formed of a flexible, impermeable material. The drainage channel, when placed on a downward slope, will extend downward along the slope to an elevation that is below the sidewall. A flap that is configured to be affixed to a sidewall of the collapsible containment structure may provide the seal for the first end to the sidewall. The flap may be formed of the same flexible, impermeable material as the drainage channel, or it may be formed of a different impermeable material.

In other embodiments, a method of forming a drainage channel in a collapsible secondary containment structure includes: (i) cutting an opening into a sidewall of the collapsible containment structure so that the opening includes a top boundary that is formed in the sidewall and a bottom boundary that is positioned at an intersection of the sidewall and a base of the collapsible containment structure; and (ii) attaching a drainage channel to the sidewall. Attaching the drainage channel to the sidewall includes: (a) positioning a first end of the drainage channel at the opening of the sidewall; and (b) sealing a flap that includes the first end to the sidewall around the opening. The channel, and optionally, also the flap, are formed of a flexible, impermeable material that will extend along a slope to an elevation that is below the sidewall.

DETAILED DESCRIPTION

Terminology that is relevant to this disclosure is provided at the end of this detailed description. The illustrations are not to scale.

Figure 1:
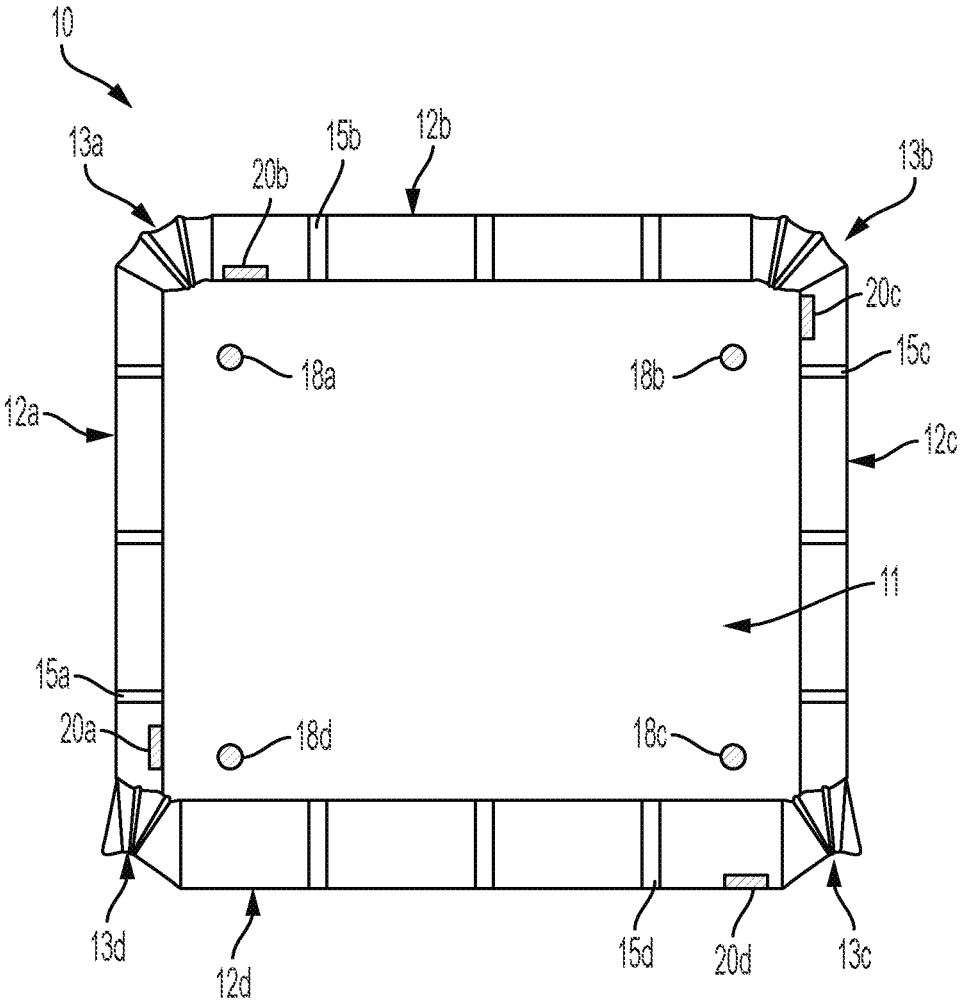
FIG. 1 illustrates a perspective view of an example collapsible containment structure.

FIG. 1 illustrates a perspective view of an example collapsible secondary containment berm structure 10 to which a drainage system may be attached. The structure 10 includes a containment area that is formed and bounded by base 11 and sidewalls 12a-12d (which may be collectively and individually referred to with reference number 12) that extend upward from the base 11. The base 11 and sidewalls 12 are made of an impermeable, and optionally flexible, sheet material such as a thin polyvinyl chloride (PVC) material, a synthetic resin, a coated synthetic fabric geomembrane liner such as that sold under the trade name XR5®, or another fabric with a vinyl or polyurethane coating. The sidewalls also may be made of compressible foam. The bottom of each sidewall 12 is integral with or connected via an impermeable seal to the base 11 to prevent liquids from seeping out of the containment area. Optionally, each sidewall 12 may include one or more reinforcement members 15a-15d made of a rigid plastic, metal or other material that will enable the sidewalls to maintain their shape when raised into an upright position. Alternatively, some or all of the sidewalls may be fully rigid but foldable via a hinge to allow vehicles to enter into the containment structure 10.

Flexible connecting members 13a-13d are connected to adjacent pairs of sidewalls via an impermeable seal. The seal may be formed with a watertight adhesive, by ultrasonic or heat welding, by molding the components together, or by fasteners such as bolts and caskets, or by other connecting structures. The flexible connecting members can expand and contract to allow their connected sidewalls to be raised to a position that is perpendicular to the base 11 or lowered to be parallel to the base 11. For example, as shown in FIG. 1 each flexible connecting member (such as 13a) includes material folded in an accordion-fashion so that it is narrower at an end that connects to the base 11 and wider at an opposite end that extends from the tops of the adjacent connected sidewalls (such as sidewalls 12a and 12b). In this way, the flexible connecting members 12a-12d can be folded inward to raise either or both of their adjacent sidewalls, and they can be unfolded outward to lower either or both of their adjacent sidewalls. However, the invention is not limited to a folding accordion structure, and other flexible connecting member configurations that enable the sidewalls to be raised and lowered may be used. The flexible connecting members 13a-13d may be made of the same impermeable, flexible sheet material as is used for the base 11 and sidewalls 12, or they may be made of a different impermeable, flexible material.

Although the embodiment shown in FIG. 1 includes four sidewalls 12a-12d and four connecting members 13a-13d, any number of sidewalls and connecting members may be used. For example, instead of having a square or rectangular shape, the containment structure 10 may have four sidewalls and a pentagon shape, six sidewalls and a hexagon shape, a single round sidewall, or other shapes. In addition, not all of the sidewalls need to be collapsible. For example, in some embodiments the connecting members 13a and 13b may be flexible to enable sidewall 12b to be raised and lowered, while some or all of the other connecting members 13c and 13d may be fixed to maintain sidewalls 12a, 12c and/or 12d in an upright shape.

FIG. 1 also shows that each sidewall 12 may include a drainage outlet 20a-20d. (This document may simply use reference number 20 to refer to any of the drainage outlets.) Although FIG. 1 shows that each sidewall 12 includes a corresponding drainage outlet 20, in practice some sidewalls may not include a corresponding drainage outlet. In addition or alternatively, some sidewalls may include more than one drainage outlet. Although not required, each drainage outlet drainage outlet 20a-20d may be positioned proximate to a corner of the containment structure, such as near one of the connecting members 13a-13d, so that they are spaced apart and facilitate outward flow of fluid from the containment area in multiple directions.

Figure 2:
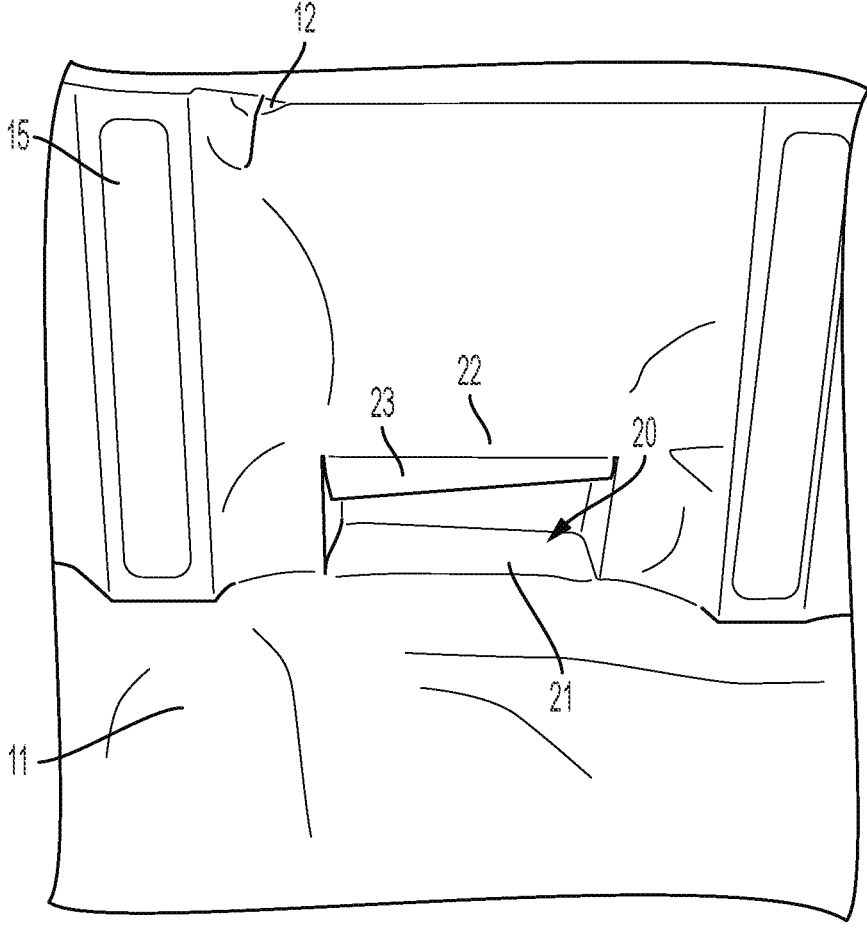
FIG. 2 illustrates an example drainage outlet that leads to a drainage channel, as viewed from inside of the containment structure.
Figure 3:
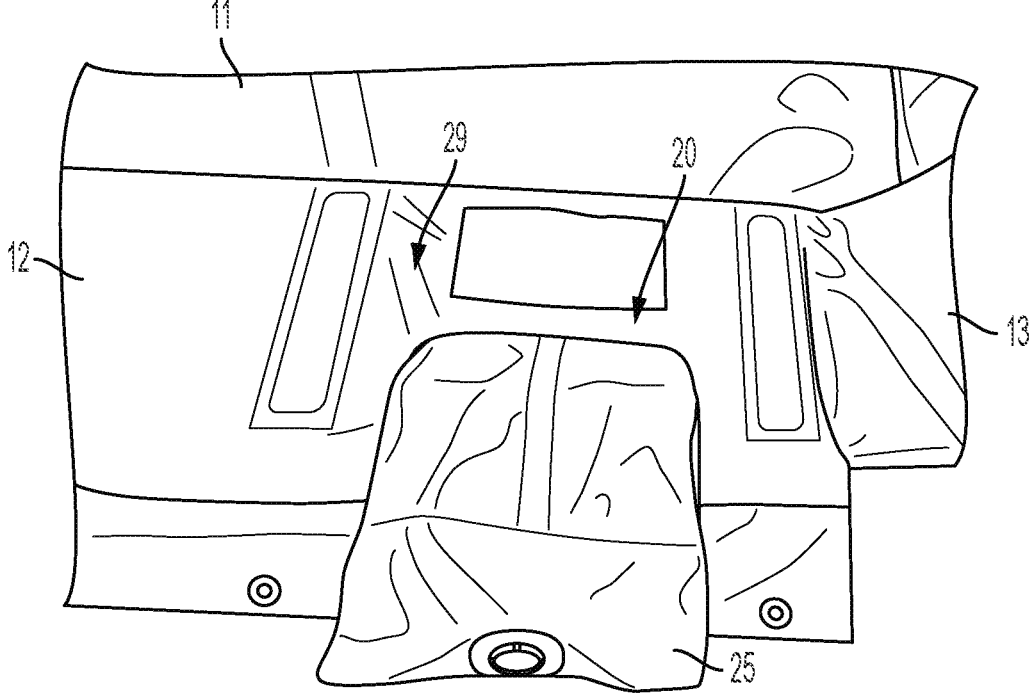
FIG. 3 illustrates an example drainage channel, as viewed from outside of the containment structure.

FIG. 2 illustrates an example drainage outlet 20, as viewed from inside of the containment structure's containment area. FIG. 3 illustrates an example drainage outlet 20, as viewed from outside of the containment structure. The drainage outlet 20 is an opening formed in the sidewall 12. The opening has a bottom boundary 21 that extends along the intersection of the sidewall 12 and the base 11, and a top boundary 22 that is formed in the sidewall 12. The opening of the drainage outlet 20 forms the first end of a drainage channel 25 that extends away from the sidewall 12. The drainage channel 25 is formed of a flexible, impermeable material that is sealed to the drainage outlet 20 at a first end. The material of the drainage channel 25 may be the same as that of the sidewalls 12 and/or base 11, or it may be a different material.

If an existing secondary containment structure is not equipped with a drainage channel such as those described in this document, it could be retrofitted in the field with a kit comprising a template to cut the proper size of an opening that serves as a drainage outlet in which the drainage channel will fit. The kit would include parts required to properly install and create a waterproof seal by methods of waterproof epoxy, adhesives, ultrasonic welding, heat sealing or any another sealing process to insure the retrofitted drainage channel adheres tightly and is waterproof For example, optionally, one or more segments of the sidewall 12 may be cut and folded down to extend into the opening 20 of the drainage channel 25 to help facilitate a seal at the connection of the drainage channel 25 to sidewall 12. This is shown by way of example with segment 23. In this way, an existing containment structure may be retrofitted to incorporate a drainage channel 25 by cutting the sidewall to form an opening. The drainage channel 25 may extend from a flap 29 that can be affixed to the exterior of the sidewall 12 and sealed around the opening 20 on the exterior, while the cut-away segments of the sidewall may be placed into (and optionally affixed to) the interior of the drainage channel 25. Alternatively, the flap 29 may be affixed to the interior of the sidewall 12, and the cut-away segments of the sidewall may be fully removed or placed over the exterior of the drainage channel 25. In either case, the affixing may be done by any process that provides a watertight seal, such as by using a waterproof epoxy, by ultrasonic welding or heat-sealing, or by another sealing process or structure such as those described above. The flap 29 may be formed of the same flexible, impermeable material as the drainage channel, or it may be formed of a different impermeable, and optionally flexible, material.

Figure 4:
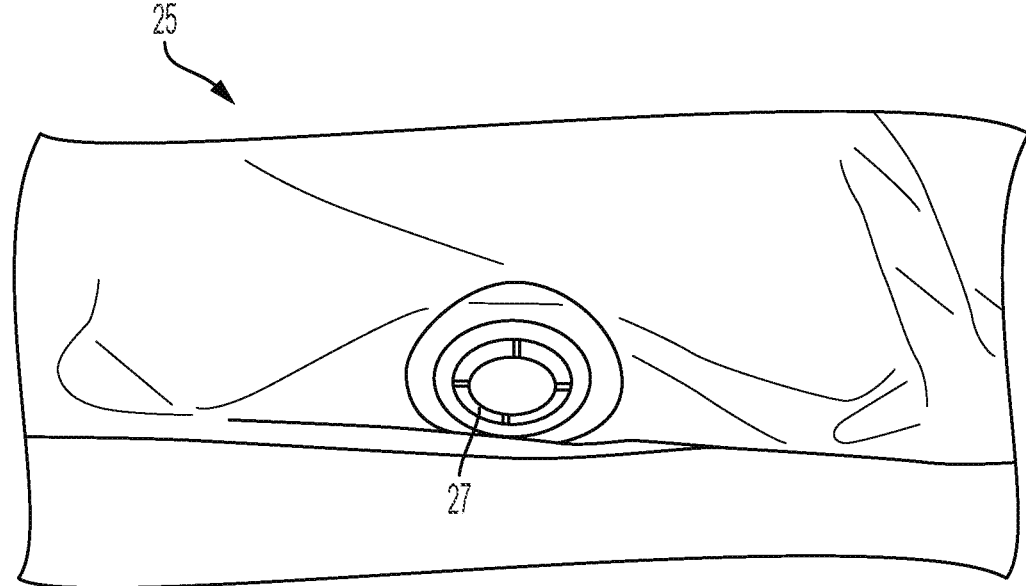
FIG. 4 illustrates an example fitting on the end of a drainage channel.

FIG. 4 illustrates that the second end of each drainage channel 25 will include an attached fitting 27 that is configured to connect the drainage channel 25 to a hose or filter. The fitting 27 may be a threaded fitting such as an externally-threaded (male) hose connector that is configured to fit within a hose end coupling having internal threads, or an internally-threaded (female) hose connector that is configured to fit over a hose end coupling having external threads. Other types of connectors, such as a camlock or a quick connector fitting, may be employed as fitting 27.

Figure 5:
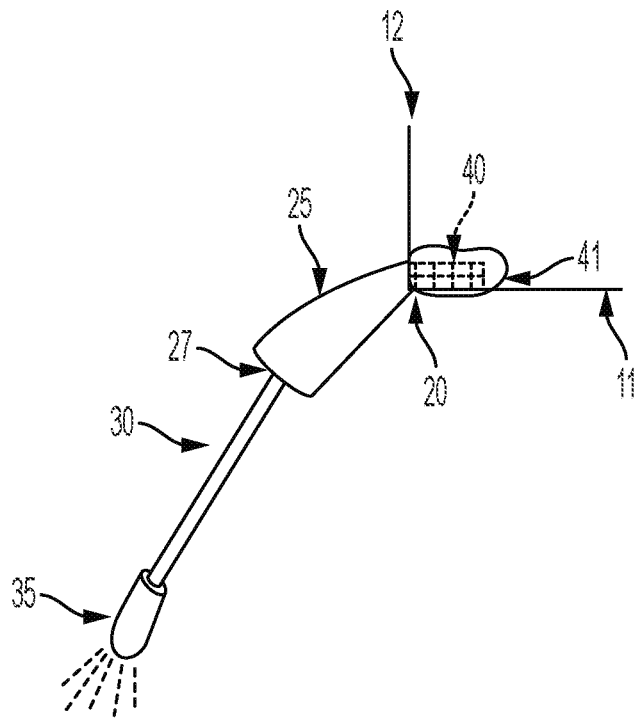
FIG. 5 illustrates how a drainage channel may extend from a containment structure and lead to a hose and/or filter.

FIG. 5 is a block diagram illustrating how the flexible material of the drainage channel 25 permits the drainage channel to extend downward and away from both the sidewall 12 and floor 11 of the containment structure. In the field, the containment structure can thus be positioned on a slope in which fluid from the containment structure will flow out of the structure through the drainage channel 25, especially when the drainage channel 25 is positioned on a slope that extends downward and away from the containment structure. The slope may be a naturally occurring slope, or it may be a fabricated slope that is formed by digging a channel or adding fill to raise the area under the containment structure's floor 11. By including drainage channels 25 in or proximate to each corner of the containment structure (as shown by drainage outlets 20a-20d of FIG. 1), the containment structure can be positioned on a variety of terrains in which at least one of the drainage outlets will receive a naturally occurring, gravity-fed outward flow of fluid from the containment structure.

FIG. 5 also illustrates that one end of a hose 30 may be attached to the fitting 27 of a drainage channel 25. A filter 35 may be attached to the other end of the hose 30. In addition or alternatively, although not shown in FIG. 5, a filter 35 may be connected to the end of the drainage channel 25, and the hose may be attached to the filter 35 instead of directly attached to the drainage channel 25. The filter 35 may be any suitable filter that separates solid and/or other contaminants from water. Example filters are disclosed in U.S. patent application Ser. No. 16/997,016, filed Aug. 19, 2020 and titled "Storage Containment Purge Valve Filter", the disclosure of which is fully incorporated into this document by reference. For example, as described in that patent application, the filter 35 may be a filter unit that includes a housing that is configured to be removably connected to a hose 30 or to the fitting 27 of the drainage channel 25. The housing of the filter 35 may include a first section, a second section, and an end cap. A first filter section may be positioned in the first section of the housing, and it may include a first pouch, along with a first absorbent material within the pouch. Suitable absorbent materials include oleophilic yet hydrophobic materials, such as polymeric materials and/or materials containing polyester, polypropylene or combinations of these. (This document uses the term "absorbent" to refer to materials that are either absorbent or adsorbent) A second filter section may be positioned in the second section of the housing, and it may include a second pouch, along with a second absorbent material within the pouch. The first filter section and the second filter section may be positioned in sequence along a direction of flow of fluid within the housing from the drainage channel fitting to the end cap. Each of the first pouch and the second pouch may be formed of a flexible, permeable material such as nylon, a fibrous polyester material, a cellulosic material, a blend of polyester with cellulosic material, and/or polypropylene. The first absorbent material, the second absorbent material, or both may be formed of a polymer material, a polyester material, polypropylene, or a combination of any of these. The first absorbent material and the second absorbent material may be the same material, or they may be different materials. The filter 35 also may include a third section that is positioned between the first filter section and the second filter section, and that contains an intermediate filter portion that is positioned between the first filter section and the second filter section. The intermediate filter section may be made of a loose absorbent material, and/or a coarsely or finely crumbled filtering material. Optionally, the third filter section may have a diameter that is larger than diameters of the first filter section and of the second filter section.

FIG. 5 also illustrates that the drainage outlet 20 that leads to drainage channel 25 may include a drain filter. For example, as shown in FIG. 5 the drain filter may include a filter cage 40 comprising a skeleton made of a rigid or semi-rigid material may be placed within the drainage outlet 20 and extend into the drainage channel 25, and a filter insert 41 may be placed within the filter cage. The filter insert 41 may be formed of a polymer material, a polyester material, polypropylene, another absorbent material, or a combination of any of these. The filter cage 40 is optional, and optionally the drain filter may simply comprise the filter insert 41 with filter material placed within a permeable pouch.

Figure 6:
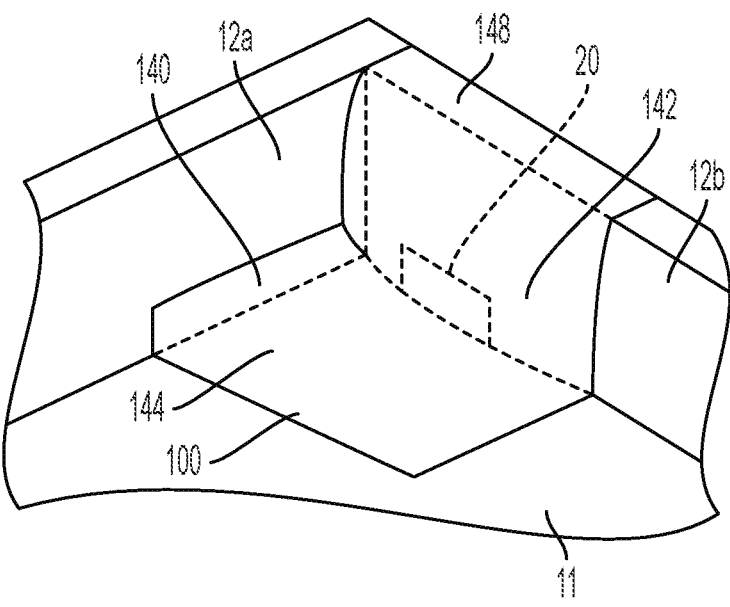
FIG. 6 illustrates an example drainage filter that may be positioned inside of a containment area over a drainage outlet.

Alternatively, as shown in FIG. 6, a drainage filter sheet 100 may be positioned within the containment area over the drainage outlet 20. The drainage filter sheet 100 may be a planar sheet of filtering fabric. For example, the filtering fabric may include thousands of micro-ridges per each square foot. These micro-ridges may trap suspended fine particulate matter (such as foreign matter), hydrocarbons (such as petroleum), bioremediation microbes (such as bacteria, fungi, algae, yeast, or the like), heavy metals (such as cadmium, lead, zinc, or the like), or the like, while allowing clean water to pass through the filtering fabric. For example, the filtering fabric may have pores that are no larger than about 100 microns to about 200 microns, and it may thus be able to filter particles larger than about 100 microns to about 200 microns. As more particles are trapped on the filtering fabric, the filtering size may reduce even more to a range of about 20 microns to about 50 microns due to the buildup of particles on the filtering fabric surface, which blocks portions of the material's pores. A similar material may be found in the Oil Shark® Fence product sold by CEREX Advanced Fabrics. For example, the filtering fabric may be made from Nylon 6,6 nonwoven fabric material, which may separate and trap contaminates found in oil-in-water emulsion. Alternatively, the filtering fabric may be made from other polymers (such as polyester), organic materials (such as cotton), or the like. FIG. 6 illustrates an isometric view of an example drainage filter sheet 100 placed over a drainage outlet 20. The drainage filter sheet 100 may include a first segment 142 that is placed against the sidewall 12b that contains the drainage outlet 20 and a second segment 144 that extends along a portion of the floor 11. Optionally, a draping segment 148 may extend from the first segment 142 and over the sidewall 12b to help hold the filter in place. Also optionally, a side extension 140 may extend up from the second segment 144 along the other sidewall 12a that forms the corner with sidewall 12b. The side extension 140 will help to prevent fluid from seeping under the filter 100 at the corner without passing through the filter sheet 100.

Returning to FIG. 1, the floor 11 of the containment structure 10 optionally may include one or more floor drains 18a-18d. (This document may simply use reference number 18 to refer to any of the floor drains.) Like the drainage outlets 20, each floor drain 18 may be positioned proximate to a corner of the structure, or otherwise positioned so that the floor drains are spaced apart from each other to receive fluid flow in multiple gravity-fed directions depending on the slope of the terrain on which the floor 11 is placed. Each floor drain 18 will be a drainage outlet that may have an attached drainage channel that uses the structure of drainage channel 25 described in FIGS. 3-5, or it may simply lead to a threaded or other fitting to which a hose, pipe, or filter may be connected. Optionally, each floor drain may include a filter such as filter insert 41 of FIG. 5 and/or filter sheet 100 of FIG. 6.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

In this document, when terms such as "first" and "second" are used to modify a noun, such use is simply intended to distinguish one item from another, and is not intended to require a sequential order unless specifically stated. The terms "approximately" and "about" when used in connection with a numeric value, is intended to include values that are close to, but not exactly, the number. For example, in some embodiments, the term "approximately" may include values that are within +/−10 percent of the value.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A secondary containment structure comprising:
a base;
one or more impermeable, collapsible sidewalls that surround the base to form a containment area;
a first drainage outlet having an opening with a top boundary and a bottom boundary, wherein:
the first drainage outlet is positioned at an intersection of the base with a first sidewall of the one or more sidewalls;
the bottom boundary is positioned to extend along the intersection of the base with the first sidewall of the one or more sidewalls,
the top boundary is formed above the intersection and in the first sidewall; and
a drainage channel having a first end that is sealed around the opening of the first drainage outlet, wherein the drainage channel:
is formed of a flexible, impermeable material that, when placed on a downward slope will extend along the slope to an elevation that is below the base,
extends from the first end to a second end that is opposite the first end,
is tapered so that the first end is larger than the second end, and
includes a fitting that is attached to the second end and that is configured to connect to a hose or filter; and
flexible connecting members that connect one of the sidewalls to adjacent sidewalls to allow the connected one of the sidewalls to be raised to a position that is perpendicular to the base and lowered to a position that is parallel to the base.

2. The secondary containment structure of claim 1, wherein a portion of the first sidewall is cut and folded down to extend into the drainage channel.

3. The secondary containment structure of claim 1, wherein the first drainage outlet is positioned proximate to a corner of the containment structure, wherein the corner is formed by the first sidewall and a second sidewall of the one or more sidewalls.

4. The secondary containment structure of claim 1 further comprising:
a plurality of additional drainage outlets, each of which is:
positioned proximate to a corresponding additional corner of the containment structure, and
has an opening with a bottom boundary that is positioned to extend along an intersection of the base and a bottom boundary of one of the one or more sidewalls.

5. The secondary containment structure of claim 1, further comprising a sheet of filter material that is positioned on the base and which extends upward along the first sidewall to cover the first drainage outlet.

6. The secondary containment structure of claim 1, further comprising a filter insert that is positioned in the opening of the first drainage outlet and that extends into the first drainage channel.

7. The secondary containment structure of claim 1, further comprising a floor drain.

8. The secondary containment structure of claim 1, wherein:

the one or more sidewalls comprise a plurality of sidewalls, the bottom boundary is also partially positioned to extend along an intersection of the base with a second sidewall of the plurality of sidewalls, and the top boundary is also partially formed in the second sidewall.

9. The secondary containment structure of claim 1, wherein the first end of the drainage channel is sealed around the opening of the drainage outlet via a flap that is affixed to the first sidewall.

10. The secondary containment structure of claim 1, wherein one or more cut-away segments of the first sidewall extend into the drainage channel.

11. A drainage system for a collapsible secondary containment structure, the drainage system comprising:

a drainage channel having:

a first end that is configured to be sealed around an opening of a first drainage outlet in a sidewall of the collapsible secondary containment structure, wherein the opening is positioned at an intersection of the base with a first sidewall of the one or more sidewalls; and a second end that is opposite the first end, wherein the second end includes or is connected to a filter;

wherein the drainage channel is formed of a flexible, impermeable material, and wherein the drainage channel is configured to, when placed on a downward slope, extend downward along the slope to an elevation that is below the sidewall.

12. The drainage system of claim 11, further comprising a flap that is:

attached to the first end of the channel; and configured to attach to the sidewall and thereby seal the first end of the drainage channel to the sidewall.

13. The drainage system of claim 11, wherein the flap is comprised of the flexible, impermeable material or a different impermeable material.

14. The drainage system of claim 11, wherein the drainage channel is tapered so that the first end is larger than the second end.

15. A method of forming a drainage channel in a collapsible secondary containment structure, the method comprising:

cutting an opening into a sidewall of the collapsible containment structure so that the opening is positioned at an intersection of the base with the sidewall and includes a top boundary that is formed in the sidewall and a bottom boundary that is positioned to extend along an intersection of the sidewall and a base of the collapsible containment structure, wherein the collapsible containment structure comprises:

a plurality of sidewalls, and flexible connecting members that connect one of the sidewalls to adjacent sidewalls to allow the connected one of the sidewalls to be raised to a position that is perpendicular to the base and lowered to a position that is parallel to the base, in which the lowered position is configured to allow a vehicle or storage tank to enter a containment area of the containment structure; and attaching a drainage channel to the sidewall by:

positioning a first end of the drainage channel at the opening of the sidewall, and sealing a flap that includes the first end to the sidewall around the opening;

wherein:

the flap and the drainage channel are formed of a flexible, impermeable material, and when positioned on a slope, the drainage channel will extend away from the sidewall and downward to an elevation that is below the sidewall, wherein the drainage channel is tapered so that the first end is larger than the second end.

16. The method of claim 15, further comprising cutting a portion of the first sidewall and folding the portion to extend into the drainage channel.

17. The method of claim 15, wherein cutting the opening comprises doing so in a position that is proximate to a corner formed by one of the flexible connecting members.

18. The method of claim 15, further comprising positioning a filter insert in the opening of the sidewall so that the filter insert extends into the first drainage channel.

* * * * *